United States Patent [19]
Banks et al.

[11] Patent Number: 5,377,871
[45] Date of Patent: Jan. 3, 1995

[54] DISPENSER HAVING ROLLER FOR DISPENSING FLUID FROM A COLLAPSIBLE BAG

[75] Inventors: Stewart Banks, Brantford, Canada; George W. Roders, Kenosha, Wis.; Mark D. Jamison, Zion, Ill.; Nicholas Williamson, Burington, Canada

[73] Assignee: Marlingford Holdings Limited, Guernsey, Channel Islands

[21] Appl. No.: 247

[22] Filed: Jan. 4, 1993

[51] Int. Cl.⁶ .............................................. B67D 5/22
[52] U.S. Cl. .............................. 222/41; 222/101; 222/105; 222/181
[58] Field of Search ............... 222/41, 101, 105, 181, 222/185, 207, 214

[56] References Cited

U.S. PATENT DOCUMENTS

| | | | |
|---|---|---|---|
| 3,741,439 | 6/1973 | Vehrs | 222/103 |
| 3,881,641 | 5/1975 | Pliml, Jr. et al. | 222/214 X |
| 4,130,224 | 12/1978 | Norman et al. | 222/185 |
| 4,186,848 | 2/1980 | Walter | 222/214 X |
| 4,256,242 | 3/1981 | Christine | 222/207 |
| 4,349,133 | 9/1982 | Christine | 222/183 |
| 4,463,876 | 8/1984 | Swallert | 222/94 |
| 4,491,245 | 1/1985 | Jamison | 222/107 |
| 4,564,127 | 1/1986 | Garabedian et al. | 222/96 |
| 4,667,854 | 5/1987 | McDermott et al. | 222/101 |
| 4,690,307 | 9/1987 | Hogan | 222/105 X |
| 4,715,517 | 12/1987 | Potter et al. | 222/181 |
| 4,895,276 | 1/1990 | Maldonando | 222/214 X |
| 4,932,562 | 6/1990 | Christine | 222/96 |
| 5,000,350 | 3/1991 | Thomsen | 222/103 |
| 5,016,779 | 5/1991 | Williamson | 222/95 |
| 5,067,635 | 11/1991 | Thomsen | 222/103 |
| 5,105,992 | 4/1992 | Fender et al. | 222/214 X |

Primary Examiner—Andres Kashnikow
Assistant Examiner—Joseph A. Kaufman
Attorney, Agent, or Firm—Ladas & Parry

[57] ABSTRACT

A fluid dispenser is disclosed for dispensing a fluid from a pouch having a discharge passage that extends along a tortuous path. The dispenser has a dispenser station and dispenser mechanism in the dispenser station. In one aspect the dispenser mechanism comprises a backstop on one side of the dispenser path and a cam operated cylindrical roller confronting the backstop located on the other side of the dispenser path. The roller is attached to a roller bracket which is pivotally attached to the interior of a hollow pushbutton. The pushbutton is mounted in an opening in the dispenser front cover. Springs are attached to the bracket and the front cover which maintain the roller against the flexible dispenser compartment of the pouch. Depressing the pushbutton forces the roller to trap the upper portion of the pouch flexible dispenser compartment between the roller and backstop to initially seal the dispenser compartment at its upper end and further pushbutton action forces the roller down the dispenser compartment thereby causing expulsion of the fluid trapped in the dispenser compartment.

13 Claims, 4 Drawing Sheets

DISPENSER HAVING ROLLER FOR DISPENSING FLUID FROM A COLLAPSIBLE BAG

FIELD OF THE INVENTION

The present invention relates to fluid dispensers for use with flexible fluid pouches for dispensing fluids such as liquid soaps stored in the pouches.

BACKGROUND OF THE INVENTION

This invention relates to improved fluid to dispensers of the type used to dispense liquid soap from a flexible pouch having a tortuous discharge passageway. An example of a pouch of this nature is disclosed in U.S. Pat. No. 4,491,245.

Fluid dispensers for dispensing small quantities of liquid soap from a pouch are well known. U.S. Pat. Nos. 4,463,876 and 4,564,127 are directed to typical fluid dispensers which include upper and lower jaws which can be manipulated to sequentially open and close to meter a predetermined quantity of fluid from the container. Difficulty has been experienced with this type of container in obtaining a tight seal between both upper and lower jaws.

Other dispensers use hard swash plates or cams having hard, curved surfaces to compress a portion of the pouch for expelling liquid therefrom. A drawback to such arrangements are that the swash plates or cams do not ride smoothly down the pouch since the surfaces thereof are hard with the result that the cam or swash plate jiggles side-to-side causing uneven pressure across the discharge portion of the pouch. Another drawback with current dispensers employing flexible dispenser pouches is that the pouches are designed to be hung from pegs or suspended in the dispenser housing. This necessitates wasting time aligning the dispenser pegs with holes in the pouch. Further, at present the only indication that a fluid pouch is nearly empty is when a reduced volume of fluid is being discharged from the pouch.

Accordingly, it would be advantageous to provide a fluid dispenser for dispensing liquids such as soap detergents, foodstuffs and the like which provides smooth fluid expulsion and which is provided with an indicator for indicating that the pouch is nearing empty.

SUMMARY OF THE INVENTION

The present invention provides a fluid dispenser for dispensing fluid from a flexible dispenser compartment of a pouch of the type having a discharge passage that extends along a tortuous path to a discharge opening at a lower end of the pouch. The dispenser housing is provided with a dispenser station through which the fluid is to be dispensed along a dispenser path that extends therethrough. The dispenser housing includes means for supporting the pouch and a backstop on one side of the dispenser path substantially below said support means. The dispenser is provided with cam means having an arcuate face portion confronting the backstop and located on the other side of the dispenser path. A pushbutton means confronts the backstop and engages the cam means. The pushbutton means is pivotally attached to the housing and the cam means is pivotally coupled to the pushbutton means. The dispenser includes spring bias means coupled between the cam means and the dispenser housing. Pushing the pushbutton means toward the backstop causes the cam means to pivot with respect to the pushbutton means and to move downwardly along the backstop and against the action of the spring bias means with the flexible dispenser compartment between the cam means and the backstop thereby expelling a quantity of fluid from the dispenser. The dispenser includes a view port for looking into the interior of the dispenser station and an indicator means engaging the pouch when the pouch is supported within the dispenser housing for indicating when the pouch has been substantially depleted of fluid and in need of being replaced. The indicator means is a visual indicator means comprising an arm with opposed ends, a visually distinctive portion mounted at one end of the arm and a pouch engagement member attached to the other end of the arm. The arm is pivotally mounted in close proximity to the fluid pouch with the pouch engagement member bearing against the pouch so that when the pouch contains fluid therein the visually distinctive portion is not viewable through the view port and as fluid is depleted from the pouch the pouch collapses causing the arm to pivot until the visually distinctive portion comes into view through the view port.

In another aspect of the invention there is provided a dispenser for dispensing fluid from a flexible dispenser compartment of a pouch. The dispenser includes a dispenser housing provided with a dispenser station through which the fluid is to be dispensed along a dispenser path that extends therethrough. The dispenser station is provided with a backstop. The dispenser housing includes an inclined support. A retaining plate is attached to the backstop and extends upwardly therefrom. The retaining plate includes a cutout portion and the pouch is receivable in the dispenser and cradled between the inclined support member and the retaining plate with the flexible dispenser compartment inserted through the cutout portion and extending along the dispenser path adjacent to the backstop. The dispenser provides a cam confronting the backstop and located on the other side of the dispenser path. The cam is a substantially cylindrical shaped roller having an axle extending from the ends thereof and includes a roller bracket comprising two spaced arms each provided with means for engaging the axle for rotationally mounting the roller in the bracket. A pushbutton engages the cam and is pivotally attached to the housing. A spring bias means is attached at one end thereof to the arms and at the other end thereof to the dispenser housing. The roller bracket arms are pivotally attached to the pushbutton, whereby when the pushbutton is pushed inwardly the roller is pressed against the flexible discharge compartment of the pouch and is forced downwards along the flexible discharge compartment and the roller bracket pivots about the pivotal attachment. The dispenser includes an indicator means engaging the pouch when the pouch is supported within the dispenser housing for indicating when the pouch has been substantially depleted of fluid and in need of being replaced.

BRIEF DESCRIPTION OF THE DRAWINGS

The following is a description, by way of example only, of various embodiments of the fluid dispenser constructed in accordance with the present invention, reference being had to the drawings, in which.

DETAILED DESCRIPTION OF THE INVENTION

Figure 1:
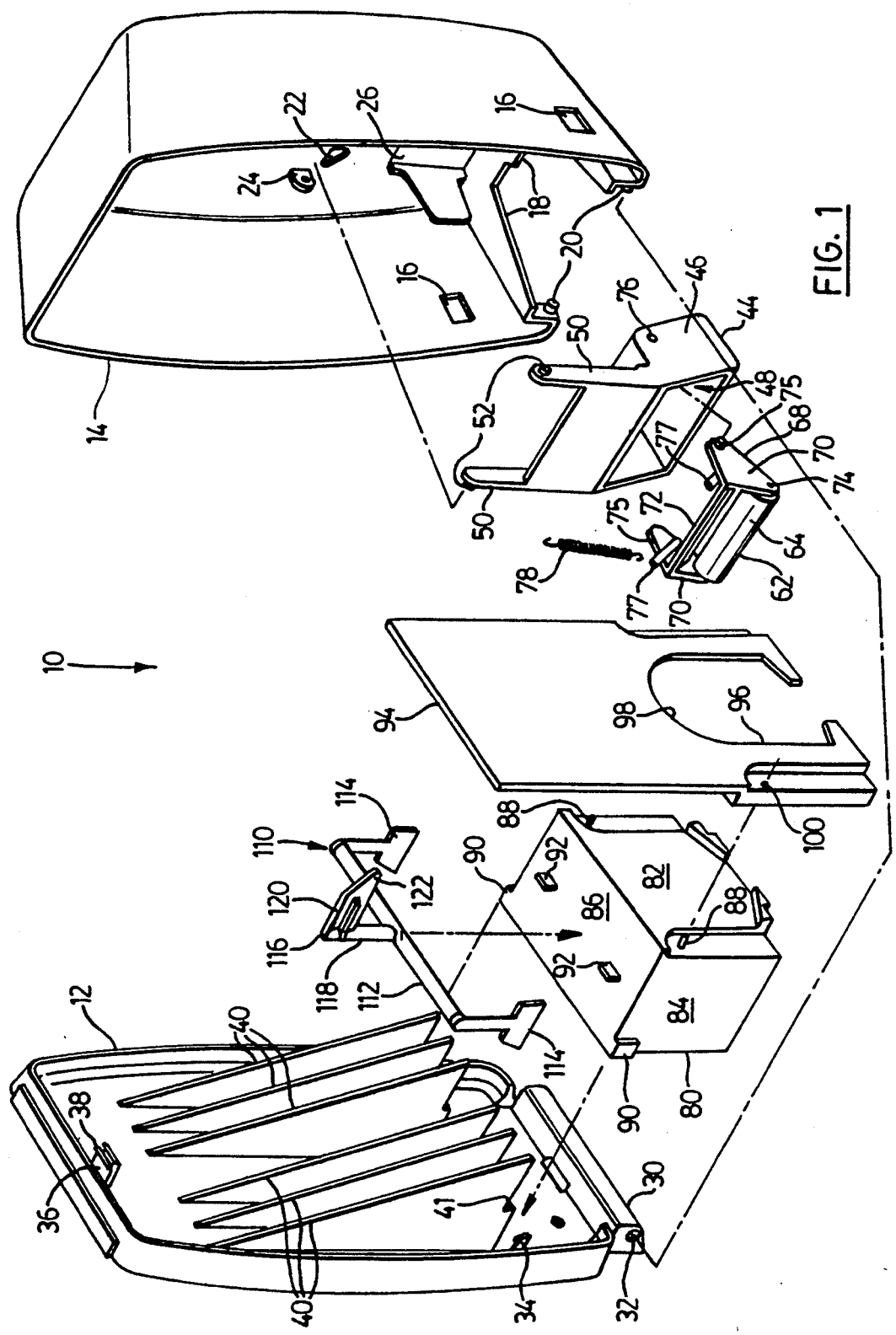
FIG. 1 is a perspective exploded view of a fluid dispenser constructed in accordance with the present invention.
Figure 2:
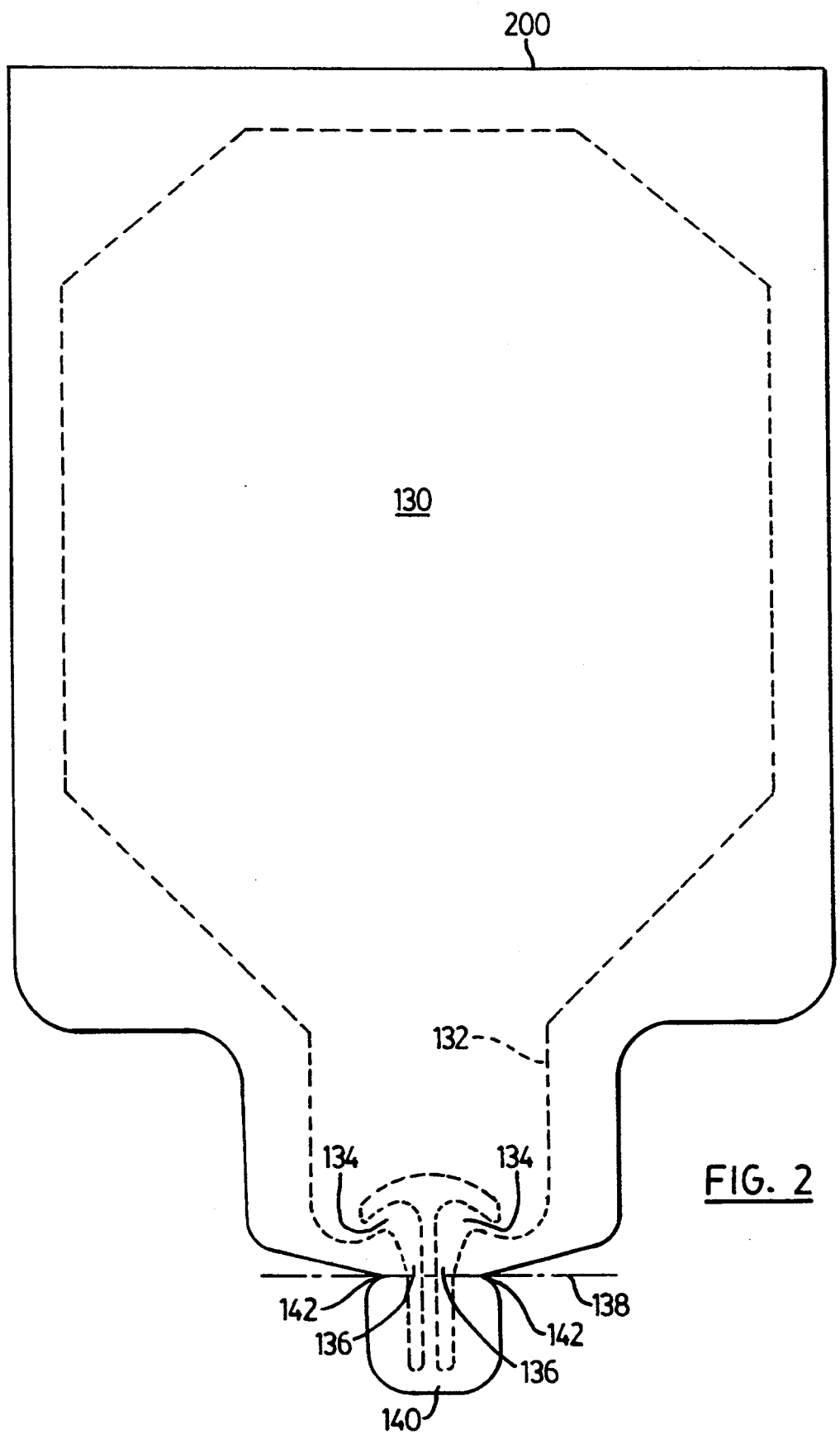
FIG. 2 is an elevational view of a fluid pouch which may be used with the dispenser of FIG. 1.
Figure 3:
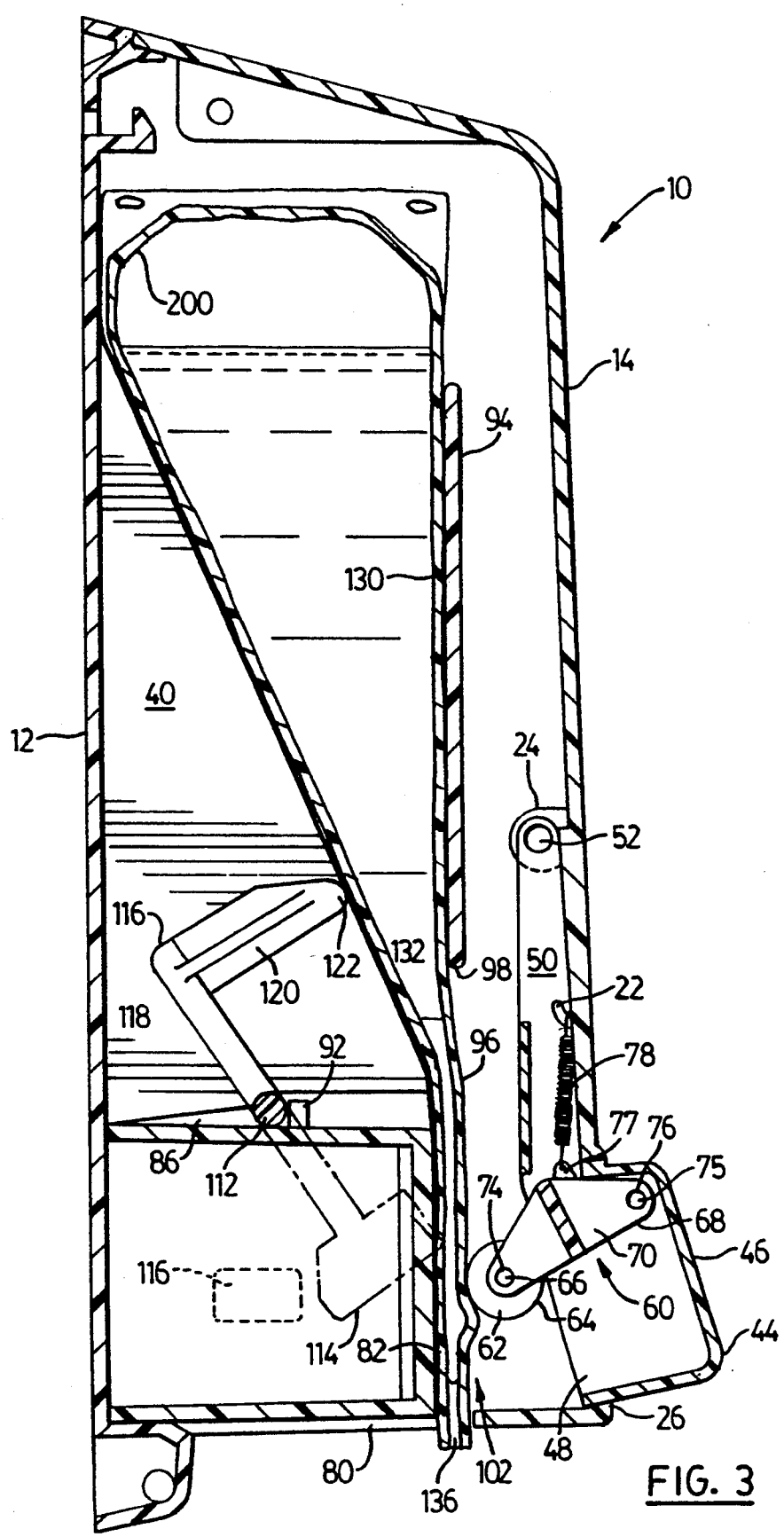
FIG. 3 is a sectional side view of the dispenser of FIG. 1 assembled, showing the fluid dispenser mechanism disengaged from the fluid pouch.

In the ensuing description of the structure and operation of the fluid dispenser, reference will be made to the drawings wherein like numerals refer to like parts. Referring first to FIGS. 1 to 3, a fluid dispenser 10 is made of a suitable molded plastic material and has a back wall 12 and a front cover 14. Cover 14 is provided with a pair of apertures 16 forming view ports in the sides of the cover and an aperture 26 located in the front portion of the cover. Cover 14 includes a cut-out portion 18 in the bottom portion of the cover and a pair of spaced pins 20 integrally formed with the cover project into the cut-out portion. Cover 14 also includes a pair of arcuate hooks 22 and a pair of spaced brackets 24 (only one shown in FIG. 1) integrally formed on the inside of the front portion of cover 14.

Back wall 12 includes a longitudinal bar 30 along the bottom thereof which is provided with holes 32 in the ends thereof for receiving pins 20 therein for pivotally attaching cover 14 to the back wall, as indicated by the lower broken line in FIG. 1. Back wall 12 includes a pair of spaced, resilient, triangular arms 34 integrally formed on the inner surface which project toward cover 14 when the dispenser is assembled, only one visible in FIG. 1. The purpose of arms 34 will be discussed presently. A resilient arm 36 having a triangular shaped end portion 38 is integrally formed with back wall 12 along the upper edge thereof which snaps over an downwardly protruding edge on the inside of the upper portion of front cover 14, not shown, for securing the upper edge of the front cover to the back wall. Back wall 12 is provided with triangular shaped support struts 40 integrally formed therewith which receive thereon a fluid or soap dispenser pouch 200, best seen in FIG. 2. Struts 40 have a cut-out portion along the bottom edge thereof to provide a retaining edge 41 to be discussed below.

Figure 4:
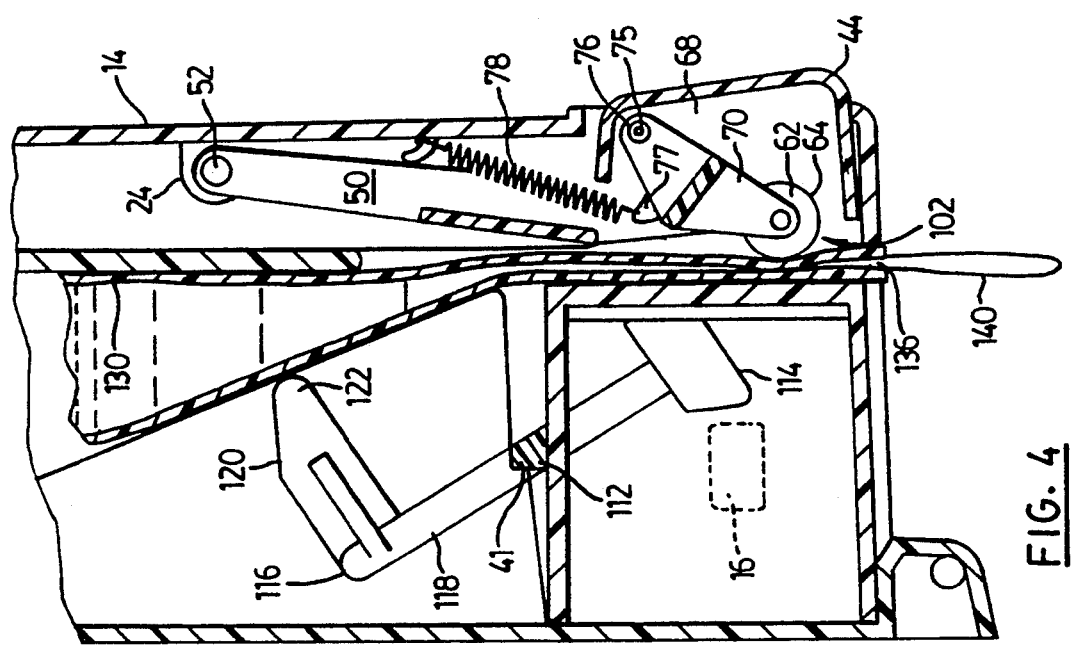
FIG. 4 is a sectional side view, broken away, similar to FIG. 3 but showing the fluid dispenser mechanism engaged with the fluid pouch for dispensing fluid therefrom.

Dispenser 10 is provided with a pushbutton 44 mounted in aperture 26 of the cover, see particularly FIGS. 3 and 4. Pushbutton 44 includes a hollow portion 46 having a front opening 48 and a pair of spaced support arms 50 having pins 52 extending outwardly therefrom which are received by brackets 24 for pivotal attaching pushbutton 44 to cover 14, see the upper broken line in FIG. 1. Hollow portion 46 partially accommodates a cam shown generally at 60 within front opening 48. Cam 60 comprises a cylindrical roller 62 provided with an arcuate surface or face 64. Roller 62 includes an axle 66 extending from each end thereof. Roller 62 is preferably fabricated of a resilient deformable material such as rubber, an elastomer or a soft flexible plastic. Cam 60 includes a roller bracket 68 comprising a pair of spaced arms 70 joined by a connector 72. Roller 62 is rotatably mounted in bracket 68 by axle 66 extending through holes 74 in arms 70. Arms 70 include pins 75 extending outwardly therefrom which are received in holes 76 located in portion 46 of pushbutton 44 so that cam 60 can pivot with respect to the pushbutton. Attached to each arm 70 is a bracket 77 to which one end of a spring 78 is attached (only one spring 78 is shown in FIG. 1). The other end of springs 78 are hooked over arcuate hooks 22 integrally formed on the inside of front cover 14.

Dispenser 10 includes an anvil block, or backstop 80 having a front face 82, sides 84, a top surface 86 and spaced mounting pins 88 projecting from face 82 spaced from the side edges thereof. A boss 90 extends outwardly from each side 84 from the upper back corner thereof, each boss being integrally formed with backstop 80. A pair of spaced stops 92 are integrally formed with top surface 86 and extend upwardly therefrom. A retaining plate 94 is provided and includes a cut-out portion 96 with an upper edge 98 and spaced holes 100 extending therethrough. Plate 94, backstop 80 and back wall 12 are secured together by inserting pins 88 into holes 100 and ultrasonically welding backstop 80 and plate 94 together. Backstop 80 is then secured to back wall 12 by aligning the backstop between arms 34 with bosses 90 in contact with the inner surface of the bosses. Backstop 80 is then pushed against back wall 12 whereby arms 34 snap over bosses 90 to lock the combination together. The alignment of these connections being represented by the middle broken lines in FIG. 1. The upper edge 98 of cut-out portion 96 is located above top surface 86 of backstop 80 when plate 94 is attached to the backstop and back wall 12. Formed between front face 82 of backstop 80 and the cylindrical surface of roller 62 is a dispenser path 102 when dispenser 10 is assembled, see FIG. 3.

Referring specifically to FIGS. 1 and 3, dispenser 10 is provided with a fluid level indicator means 110 comprising an elongate, cylindrical rod 112 having two liquid level flags or indicators 114 attached one to each end thereof. Indicators 114 may be brightly colored so as to be clearly visible. An L-shaped member 116 comprises a first arm 118 attached to rod 112 in the middle thereof and a projecting pouch engagement arm 120 attached to first arm 118. Pouch engagement arm 120 includes a rounded end portion 122 suitable to be in physical contact with pouch 200 without piercing the pouch. Indicator 110 is received on top surface 86 of backstop 80 behind stops 92 and can rotate about the longitudinal axis of rod 112, best seen in FIG. 3.

Referring to FIG. 2, a non-limiting example of a pouch 200 which may be used in combination with dispenser 10 is seen to comprise a flexible, main storage compartment 130 in flow communication with a lower, flexible dispenser compartment 132 and a pair of narrow and symmetric discharge passageways 134 that extend along two tortuous paths from the bottom of the flexible discharge compartment to a pair of discharge openings 136. As shown, pouch 200 is still intact but before commencement of use, the bottom end of the pouch comprising a tear tab 140 will be severed along a tear line collinear with line 138 joining notches 142 to open discharge openings 136. Because of the nature of the liquid in pouch 200 (preferably soap) and because of the tortuous path of discharge passageways 134, the liquid in the pouch does not leave the opening 136 until part of the pouch is actuated as by pressing by roller 62 or other mechanical equivalent. Since more than one discharge passageway 134 is provided in pouch 200, these passageways can be narrower than would be required in a pouch having only one discharge passageway. Alternatively, it will be appreciated that other currently known fluid pouches having a single serpentine fluid outlet passageway may be used.

Pouch 200 is received in dispenser 10 between support struts 40 and retaining plate 94 with flexible dispenser compartment 132 inserted through cut-out portion 96 of retaining plate 94 and received against front face 82 of backstop 80 in dispenser path 102 of the dispenser. Tear tab 140 is then detached from the rest of pouch 200. In the position shown in FIG. 3 in which pushbutton 44 is not depressed, outer surface 64 of roller 62 is spaced from pouch 200 beneath main storage compartment 130 thereby dividing storage compartment 130 from pouch dispenser compartment 132.

Figure 5:
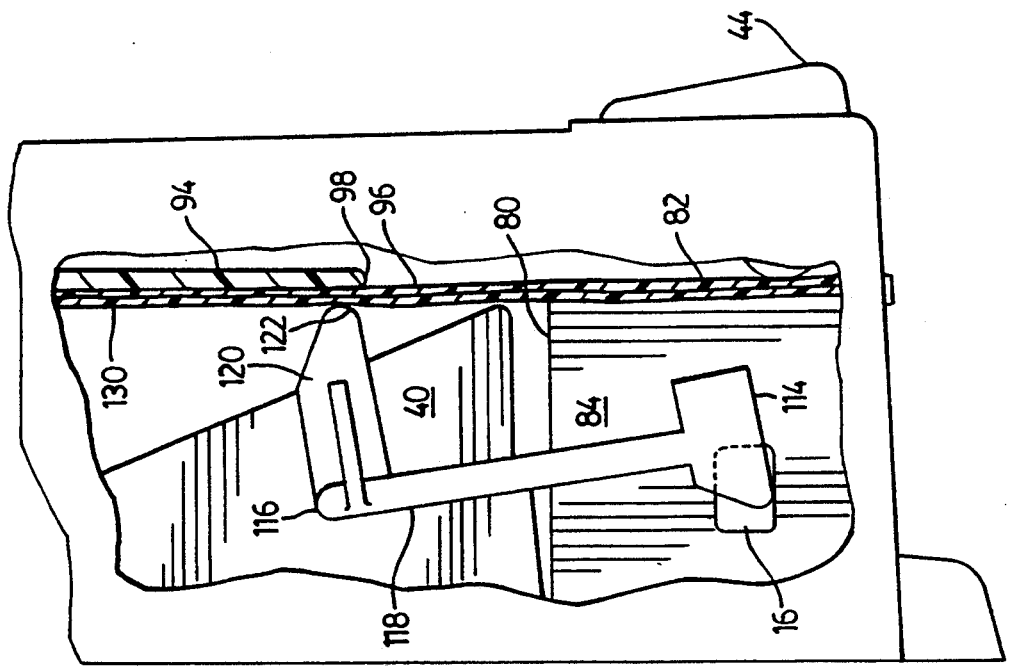
FIG. 5 is side view of the dispenser of FIG. 3, broken away, showing the liquid level indicator in the empty position.

Referring to FIGS. 3–5, in operation, when pushbutton 44 is pressed inwards, it moves through opening 26 in front cover 14, and this causes the roller 62 to move towards pouch 200 away from the rest position seen in FIG. 3 in which it is spaced from pouch 200. As pushbutton 44 is pushed further towards backstop 80, roller 62 pivots downwards about pins 74 against the restoring force of springs 78 and against front face 82 of backstop 80 with the dispenser compartment 132 between roller 62 and backstop 80 thereby expelling a quantity of fluid 140 from the dispenser compartment, best seen in FIG. 4.

The use of rubber, soft flexible plastic or an elastomer material for the construction of flexible roller 62 is advantageous because it provides some give when rolling down the flexible dispenser compartment thereby maintaining constant pressure on the dispenser compartment to provide uniform expulsion of fluid from the pouch. In contrast, hard rollers having no give tend to twist about side to side away from the dispenser compartment when rolling down a non-uniform dispenser compartment. This results in a non-uniform pressure applied across flexible dispenser compartment 132 and non-uniform expulsion of fluid from pouch 200.

An advantage associated with the use of support struts 40 and retaining plate 94 to hold pouch 200 rather than hanging the pouch from pins along the upper edge of back wall 12 is the simplified procedure of removing and replacing pouch 200 in dispenser 10 so no aligning of pouch holes and dispenser mounted pegs is required.

Release of pushbutton 44 returns it by the action of springs 78 to the position seen in FIG. 3 whereby extensible springs 78 pull roller 62 upwardly causing it to pivot upwardly about pins 74 to the start position wherein the roller is lightly engaging pouch 200. In order for springs 78 to return roller 62 to the rest position with pushbutton 44 fully retracted, hooks 22 are located forward of brackets 76 so that springs 78 which extend between the hooks and brackets are inclined downwardly and inwardly as viewed in FIGS. 3 and 4.

The operation of the fluid indication means is best described with reference to FIGS. 3–5. The fluid pouch 200 as shown in FIGS. 3 and 4 is filled with the result that pouch engagement arm 120 is pushed fully to the left so that indicators 114 attached to the ends of rod 112 are pivoted far enough to the right away from view port 16 to be out of view. As the fluid in pouch 200 is depleted the lower portion of storage compartment 130 begins to collapse as shown in FIG. 5 so that engagement arm 120 rotates outwardly towards retaining plate 94 causing indicator 114 to rotate inwardly toward view port 16 and into the range of view port 16 thereby indicating a need to replace pouch 200. Rod 112 is locked between edges 41 of support struts 40 and stops 92 on top surface 86 of backstop 80 act to stop rod 112 from moving on the top surface of the backstop when dispenser 10 is assembled.

Those skilled in the art will appreciate that other cam means having an arcuate outer surface for rolling down the dispenser portion of pouch 200 could be employed in the dispenser of the present invention as an alternative to roller 62 discussed herein.

Thus, while the fluid dispenser having an arcuate shaped cam and an indicator means for indicating when the fluid pouch needs replacement has been described and illustrated with respect to various embodiments, it will be appreciated that numerous variations of these embodiments may be made without departing from the scope of the invention disclosed herein.

We claim:

1. In a fluid dispenser for dispensing a fluid from a flexible dispenser compartment of a pouch of the type having a discharge passage that extends along a tortuous path to a discharge opening at a lower end of the pouch, the fluid dispenser having a housing comprising a dispenser station through which the fluid is to be dispensed along a dispenser path that extends therethrough, the improvement of the fluid dispenser comprising:

(a) said dispenser housing including means for supporting the pouch;

(b) backstop on one side of the dispenser path below said support means;

(c) cam means having an arcuate face portion confronting the backstop and located on the other side of the dispenser path;

(d) pushbutton means confronting the backstop and engaging said cam means, the pushbutton means being pivotally attached to said housing, said cam means being pivotally coupled to said pushbutton means;

(e) spring bias means coupled between said cam means and said dispenser housing, wherein pushing said pushbutton means toward said backstop causes said cam means to pivot with respect to said pushbutton means and to move downwardly along said backstop and against the action of said spring bias means with said flexible dispenser compartment between said cam means and said backstop thereby expelling a quantity of fluid from said dispenser;

(f) a view port for looking into the interior of said dispenser station: and (g) indicator means engaging to said pouch when said pouch is supported within said dispenser housing for indicating when the pouch has been substantially depleted of fluid and in need of being replaced, wherein said indicator means is a visual indicator means comprising an arm with opposed ends, a visually distinctive portion mounted at one end of the arm and a pouch engagement member attached to the other end of the arm, the arm being pivotally mounted in close proximity to said pouch with said pouch engagement member bearing against said pouch so that when the pouch is substantially filled the visually distinctive portion is not viewable through said view port and as fluid is depleted from said pouch the pouch collapses causing the arm to pivot until the visually distinctive portion comes into view through said view port.

2. The fluid dispenser according to claim 1 wherein said cam is a cylindrical roller having an elongate axle extending from the ends thereof, including a roller bracket comprising two spaced arms each provided with a hole extending therethrough for receiving therein the axle extending from an end of the cylindrical roller for rotationally mounting said cylindrical roller in said bracket, said spring bias means is a pair of extensible springs attached at one end to said arms and at the other end to said dispenser, and wherein said roller bracket arms are pivotally attached to said pushbutton means so that in operation when the pushbutton means is pushed inwardly, the cylindrical roller is pressed against the flexible discharge compartment of the pouch and is forced downwards against the spring bias along the flexible discharge compartment and the roller bracket pivots about said pivotal attachment.

3. The fluid dispenser according to claim 2 wherein said cylindrical roller is fabricated of a resilient material selected from the group consisting of rubber, soft flexible plastic and an elastomer material.

4. The fluid dispenser according to claim 2 including a dispenser back wall, wherein said support means comprises at least one inclined support member attached to said dispenser back wall and inclined downwardly and outwardly therefrom towards said dispenser station, including a retaining plate attached to said backstop and extending substantially vertically upwards therefrom, said retaining plate including a cutout portion having an upper edge spaced from an upper edge of said backstop thereby defining a gap therebetween, said pouch being receivable in the dispenser and cradled between said inclined support member and said retaining plate with the flexible dispenser compartment inserted through said gap and extending along said dispenser path.

5. The fluid dispenser according to claim 2 in which said pushbutton means is a hollow pushbutton mounted in a front cover of said dispenser.

6. The fluid dispenser according to claim 5 in which said pushbutton partially accommodates said cylindrical roller and said roller bracket within a front opening, the pushbutton being pivotally attached to said front cover, said pushbutton being operable to effect relative movement between said cylindrical roller and said backstop to initially seal said flexible dispenser compartment at its upper end and thereafter by rolling action to expel therefrom the fluid trapped in said flexible dispenser compartment.

7. A fluid dispenser for dispensing fluid from a flexible dispenser compartment of a pouch of the type having a discharge passage that extends along a tortuous path to a discharge opening at a lower end of the pouch, comprising:
 (a) a dispenser housing provided with a dispenser station through which the fluid is to be dispensed along a dispenser path that extends therethrough;
 (b) said dispenser housing including means for supporting said pouch:
 (c) backstop on one side of the dispenser path substantially below said support means;
 (d) cam means having an arcuate face portion confronting the backstop and located on the other side of the dispenser path;
 (e) pushbutton means confronting the backstop and engaging said cam means, the pushbutton means being pivotally attached to said housing, said cam means being pivotally coupled to said pushbutton means;
 (f) spring bias means coupled between said cam means and said dispenser housing, wherein pushing said pushbutton means toward said backstop causes said cam means to pivot with respect to said pushbutton means and to move downwardly along said backstop and against the action of said spring bias means with said flexible dispenser compartment between said cam means and said backstop thereby expelling a quantity of fluid from said dispenser;
 (g) a view port for looking into the interior of said dispenser station: and
 (h) indicator means engaging to said pouch when said pouch is supported within said dispenser housing for indicating when the pouch has been substantially depleted of fluid and in need of being replaced, wherein said indicator means is a visual indicator means comprising an arm with opposed ends, a visually distinctive portion mounted at one end of the arm and a pouch engagement member attached to the other end of the arm, the arm being pivotally mounted in close proximity to said fluid pouch with said pouch engagement member bearing against said pouch so that when the pouch is substantially filled the visually distinctive portion is not viewable through said view port and as fluid is depleted from said pouch the pouch collapses causing the arm to pivot until the visually distinctive portion comes into view through said view port.

8. The fluid dispenser according to claim 7 wherein said cam is a cylindrical roller having an elongate axle extending from the ends thereof, including a roller bracket comprising two spaced arms each provided with a hole extending therethrough for receiving therein the axle extending from an end of the cylindrical roller for rotationally mounting said cylindrical roller in said bracket, said spring bias means is a pair of extensible springs attached at one end to said arms and at the other end to said dispenser, and wherein said roller bracket arms are pivotally attached to said pushbutton means so that in operation when the pushbutton means is pushed inwardly, the cylindrical roller is pressed against the flexible discharge compartment of the pouch and is forced downwards against the spring bias along the flexible discharge compartment and the roller bracket pivots about said pivotal attachment.

9. The fluid dispenser according to claim 8 wherein said cylindrical roller is fabricated of a resilient material selected from the group consisting of rubber, soft flexible plastic and an elastomer material.

10. The fluid dispenser according to claim 8 including a dispenser back wall, wherein said support means comprises at least one inclined support member attached to said dispenser back wall and inclined downwardly and outwardly therefrom towards said dispenser station, including a retaining plate attached to said backstop and extending substantially vertically upwards therefrom, said retaining plate including a cutout portion having an upper edge spaced from an upper edge of said backstop thereby defining a gap therebetween, said pouch being receivable in the dispenser and cradled between said inclined support member and said retaining plate with the flexible dispenser compartment inserted through said gap and extending along said dispenser path.

11. The fluid dispenser according to claim 8 in which said pushbutton means is a hollow pushbutton mounted in a front cover of said dispenser.

12. The fluid dispenser according to claim 11 in which said pushbutton partially accommodates said cylindrical roller and said roller bracket within a front opening, the pushbutton being pivotally attached to said front cover, said pushbutton being operable to effect relative movement between said cylindrical roller and said backstop to initially seal said flexible dispenser compartment at its upper end and thereafter by rolling action to expel therefrom the fluid trapped in said flexible dispenser compartment.

13. A fluid dispenser for dispensing fluid from a flexible dispenser compartment of a pouch, comprising:
   (a) a dispenser housing provided with a dispenser station through which the fluid is to be dispensed along a dispenser path that extends therethrough, the dispenser station being provided with a backstop;
   (b) said dispenser housing including a support member inclined from the vertical and a retaining plate attached to said backstop and extending upwardly therefrom, said retaining plate including a cutout portion, said pouch being receivable in the dispenser and cradled between said inclined support member and said retaining plate with the flexible dispenser compartment inserted through said cutout portion and extending along said dispenser path adjacent to said backstop;
   (c) a cam confronting the backstop and located on the other side of the dispenser path, said cam having a substantially cylindrical shaped roller having an axle extending from the ends thereof, said cam including a roller bracket comprising two spaced arms each provided with means for engaging the axle for rotationally mounting said roller in said bracket;
   (d) a pushbutton being pivotally attached to said housing;
   (e) spring bias means attached at one end thereof to said arms and at the other end thereof to said dispenser housing, and wherein said roller bracket arms are pivotally attached to said pushbutton, whereby when the pushbutton is pushed inwardly the roller is pressed against the flexible discharge compartment of the pouch and is forced downwards along the flexible discharge compartment and the roller bracket pivots about said pivotal attachment; and
   (f) indicator means engaging to said pouch when said pouch is supported within said dispenser housing for indicating when the pouch has been substantially depleted of fluid and in need of being replaced.

* * * * *